Patented Apr. 7, 1925.

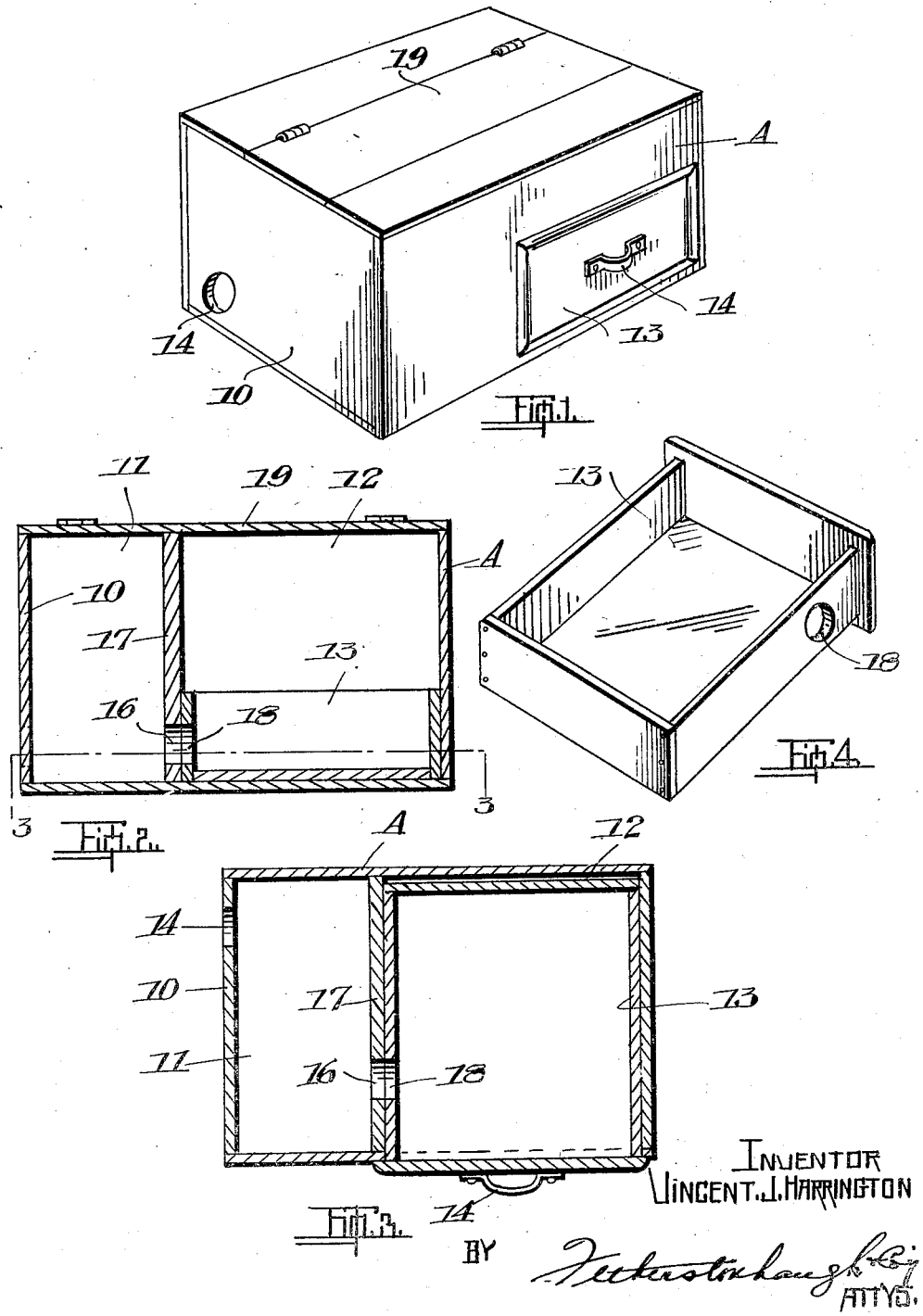

1,532,486

UNITED STATES PATENT OFFICE.

VINCENT JAMES HARRINGTON, OF SUMMERSIDE, PRINCE EDWARD ISLAND, CANADA.

FOX-BREEDING DEN.

Application filed March 8, 1924. Serial No. 697,807.

*To all whom it may concern:*

Be it known that I, VINCENT JAMES HARRINGTON, a subject of the King of Great Britain, and resident of Summerside, in the Province of Prince Edward Island and Dominion of Canada, have invented certain new and useful Improvements in Fox-Breeding Dens, of which the following is a specification.

This invention relates to improvements in fox breeding dens, and the objects of the invention are to provide an improved den of this description having a drawer in which to accommodate the nest and whereby the litter of foxes can be seen and examined, if necessary, without the mother knowing anything about it.

Heretofore, in fox breeding, the den used consisted of a box or the like provided with a hinged cover opening from the top or the roof of the den, thus directly over the mother fox and her litter so that when it was necessary to see how the litter was getting on the top of the den was opened and both the mother and the litter were immediately exposed to the view of the individual. This, particularly when the litter were still not three weeks old, nearly always resulted in the mother destroying her litter. The improved fox den herein described and illustrated is provided with a view to overcoming this very serious state of affairs in breeding foxes and, in carrying out the object in view, I provide the fox den with a drawer adapted to form the nest which can be conveniently pulled out allowing the litter to be examined when the mother fox has left the nest to feed. It is usual for the mother fox to come out into the pen or cage surrounding the den practically every day after the litter are three days old, so that all the attendant has to do, with my improved invention, is to pull out the drawer while the mother fox is out feeding, and see exactly how the litter are doing and then shut the drawer back into place, all being accomplished without the knowledge of or creating any suspicion on the part of the mother fox.

With the foregoing and other objects in view, the invention consists essentially in the novel construction of a breeding den for foxes and the like an embodiment of which is described in the present specification and illustrated in the accompanying drawings forming part of the same.

Referring now to the drawings in which like characters of reference indicate corresponding parts in each figure:

Figure 1 is a perspective view of an embodiment of the improved breeding den.

Figure 2 is a longitudinal section.

Figure 3 is a section on line 3—3 of Figure 2.

Figure 4 is a perspective detail view of the drawer nest.

In the drawings, A designates the den as a whole comprising, as here shown, a rectangular box or casing 10 of wood or any other suitable material divided into two compartments 11 and 12, the compartment 11 being considerably smaller than the other. The larger compartment 12 of the two is the nesting compartment and is provided with a nesting drawer 13 adapted to fit snugly thereinto in slidable engagement therewith, and provided with a handle 14. 15 is an aperture in the end of the box communicating with the smaller compartment which, in turn, is provided with an aperture 16 in the partition 17 dividing the compartments and adapted to register with an aperture 18 in the drawer nest. These apertures are designed for the fox to leave the nest and go outside the den to feed or otherwise. The top of the box may also be provided with a hinged portion 19 to be used when required and when all danger in examining and looking at the litter has passed.

From the foregoing it will be seen that with my improved drawer nesting means the mother fox has no means of knowing that her litter or nest has been seen or disturbed while she is away from it. The den as a whole is so arranged that when set in the pen or cage the drawer can be reached from the feeding alley, that is, the pen can be so arranged that the drawer pulls out into the alleyway by which the attendant goes around to feed the foxes. In other words, the attendant does not have to go into the pen to operate the drawer to have a look at the litter. It will further be noted that the essential feature of my invention is the drawer nest.

The drawer, as will be readily understood, can be fitted into any shape or size of den.

The simplicity and practicability of this improvement in fox dens will be, from the foregoing, apparent and the extra expense, if any, involved in fitting the ordinary breeding den would be negligible while the benefits gained by its use, in the shape of valuable foxes, would be very considerable.

As many changes could be made in this construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A breeding den of the character described comprising a suitably formed casing having a nesting compartment and a smaller compartment, a drawer adapted to contain the nest and to fit into, in slidable engagement with, the nesting compartment, and an aperture in the casing and communicating with the smaller compartment, and an aperture in the wall forming the compartments registering with an aperture in the drawer adapted for entrance and exit of the mother fox.

2. A device of the character described comprising a breeding den, having openings therein, a drawer nest operable from the outside of the den and provided with an opening designed to register with one of the den openings, the other den opening communicating with the outside.

In witness whereof I have hereunto set my hand in the presence of two witnesses.

VINCENT JAMES HARRINGTON.

Witnesses:
 EVA RUBY MACNEILL,
 GEORGE ANDREW BOWNESS.